US011091071B2

(12) United States Patent
Marais et al.

(10) Patent No.: US 11,091,071 B2
(45) Date of Patent: Aug. 17, 2021

(54) SEAT PROVIDED WITH A SYSTEM FOR LOCKING THE TRAY TABLE IN THE EVENT OF AN IMPACT

(71) Applicant: Safran Seats, Plaisir (FR)

(72) Inventors: Jean-Charles Marais, Sainte-Lizaigne (FR); Alexandre Debaugnies, Montierchaume (FR); David Ciguret, Bommiers (FR); Mourad Rajhi, Chateauroux (FR)

(73) Assignee: Safran Seats, Plaisir (FR)

( * ) Notice: Subject to any disclaimer, the term of this patent is extended or adjusted under 35 U.S.C. 154(b) by 2 days.

(21) Appl. No.: 16/610,073

(22) PCT Filed: Apr. 27, 2018

(86) PCT No.: PCT/EP2018/060930
§ 371 (c)(1),
(2) Date: Oct. 31, 2019

(87) PCT Pub. No.: WO2018/202585
PCT Pub. Date: Nov. 8, 2018

(65) Prior Publication Data
US 2020/0148081 A1    May 14, 2020

(30) Foreign Application Priority Data
May 3, 2017    (FR) ..................... 1770447

(51) Int. Cl.
*B60N 2/42*    (2006.01)
*B64D 11/06*   (2006.01)
(Continued)

(52) U.S. Cl.
CPC ............. *B60N 2/43* (2013.01); *B60N 2/4249* (2013.01); *B60N 3/004* (2013.01);
(Continued)

(58) Field of Classification Search
CPC ...... B64D 11/0638; B64D 25/04; B60N 2/43; B60N 2/4249; B60N 3/004
See application file for complete search history.

(56) References Cited

U.S. PATENT DOCUMENTS

| 2016/0046224 | A1 | 2/2016 | Saada et al. |
| 2017/0136929 | A1 | 5/2017 | Tejedor et al. |
| 2018/0229848 | A1* | 8/2018 | Murray |

FOREIGN PATENT DOCUMENTS

| FR | 2948326 A1 | 1/2011 |
| FR | 3022863 A1 | 1/2016 |
| WO | 2014154666 A1 | 10/2014 |

OTHER PUBLICATIONS

International Patent Application No. PCT/EP2018/060930, English Translation of Written Opinion of the International Searching Authority, dated Sep. 4, 2019.

(Continued)

*Primary Examiner* — Anthony D Barfield
(74) *Attorney, Agent, or Firm* — Kilpatrick Townsend & Stackton LLP

(57) ABSTRACT

The invention relates mainly to a seat comprising a backrest carrying on a rear face side a tray table that can be moved between a deployed position and a stowed position,
said tray table comprising a latch that can be moved between an unlocked position and a locked position,
characterized in that said tray table further comprises a locking system configured to hold the tray table in a stowed position following the deformation of said seat during an impact.

8 Claims, 6 Drawing Sheets

(51) Int. Cl.
*B60N 3/00* (2006.01)
*B64D 25/04* (2006.01)
(52) U.S. Cl.
CPC .......... *B64D 11/0638* (2014.12); *B64D 25/04* (2013.01); *B60N 2/4221* (2013.01)

(56) References Cited

OTHER PUBLICATIONS

International Patent Application No. PCT/EP2018/060930, International Search Report (and English translation) and Written Opinion, dated Jun. 19, 2018.

* cited by examiner

SEAT PROVIDED WITH A SYSTEM FOR LOCKING THE TRAY TABLE IN THE EVENT OF AN IMPACT

This invention relates to a seat, particularly for an aircraft, provided with a system for locking the tray table in the event of an impact.

In order to ensure a high level of safety, aircraft seats are subjected to representative tests of an air crash. An important criterion is the risk of chin entrapment by the tray table during head movement or by any significant particularities of shape or rigidity located on the trajectory of the head of the manikin sliding on the backrest.

In the current configurations of the backrest, it is common that during an impact against the backrest 1 of the front seat, the head of the passenger 2 deforms the seat, such that the chin is then likely to entrap the upper edge of the tray table 5 corresponding to the entrapment area. This is because during the impact, the head 2 depresses the bar 3 located in the area of a housing 4 positioned above a tray table 5, as shown in FIG. 1a. A return of the chin is observed after the primary impact that may consist of sliding following the impact: the backrest moves forward and the chin returns relative to the tray table 5. When the chin returns, the chin entraps the tray table 5 when it is retracted in the stowed position and opens it, as shown in FIGS. 1b and 1c. The tray table 5 is then likely to get stuck in the neck of a passenger 2, which can cause severe injuries, as shown in FIG. 1d.

The invention aims to effectively overcome this disadvantage by providing a seat comprising a backrest carrying, on a rear face side, a tray table that can be moved between a deployed position and a stowed position, said tray table comprising a latch that can be moved between an unlocked position and a locked position, characterized in that said tray table further comprises a locking system configured to hold the tray table in a stowed position following the deformation of said seat during an impact.

The invention thus makes it possible, by use of the locking element, to prevent unintentional opening of the tray table or angular offset of the tray table in the event of a crash. This avoids the risk of entrapping the chin of a passenger on the upper edge of the tray table.

In one embodiment, the locking system comprises at least one locking element connected to the latch by a motion transmission device.

In one embodiment, the motion transmission device comprises a rocker connected both to the latch and to the locking element by a pivot linkage.

In one embodiment, the rocker is connected to the latch by an arm.

In one embodiment, the arm comprises an end rotationally integral with an axis of the latch and an end rotatably mounted relative to the rocker.

In one embodiment, when the latch is in the locked position, an opening in the locking element is located opposite a fixed hook integral with a seat structure while also being at a distance from this hook, such that in the event of deformation of the seat, said hook penetrates into the opening of the locking element to hold the tray table in the stowed position.

In one embodiment, said seat has two lateral locking elements located on either side of the latch.

In one embodiment, the locking system is integrated into a cassette.

In one embodiment, the cassette is integrated into the tray table by being housed in the thickness of the tray table.

In one embodiment, the locking element is rotatably mounted relative to the cassette via a pivot linkage.

The various features, variations and/or embodiments of this invention may of course be associated with each other in various combinations insofar as they are not incompatible or mutually exclusive.

This invention will be better understood and other characteristics and advantages will become apparent upon reading the following detailed description comprising the embodiments given for illustrative purposes with reference to the appended figures, which are presented as non-exhaustive examples, which may be used to complete the understanding of this invention and the disclosure of its embodiment and, where appropriate, to contribute to its definition, in which:

FIGS. 1a to 1d, already described, are views illustrating the risk of chin entrapment by the tray table during an impact for a seat equipped with a tray table according to the prior art;

It should be noted that, in the figures, the structural and/or functional elements common to the various embodiments have the same references. Unless otherwise stated, such elements therefore have identical structural, dimensional and material properties.

Furthermore, in the remainder of the description, the relative terms "front", "rear", "lower", "upper", are to be considered for a seat in the use position in an aircraft cabin.

Figure 1A:
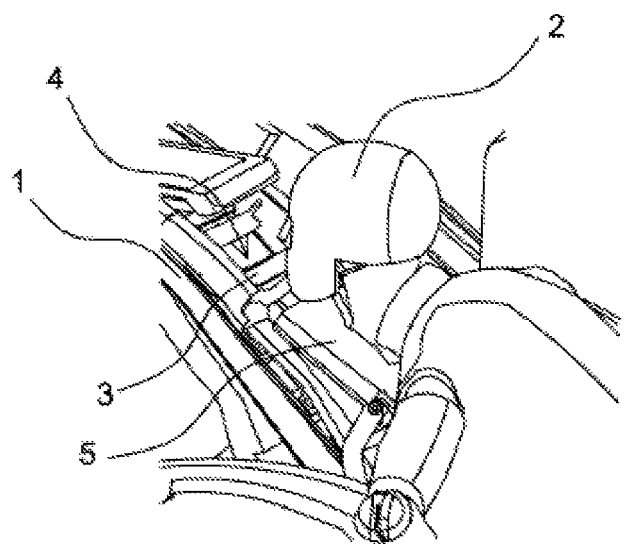
Figure 1B:
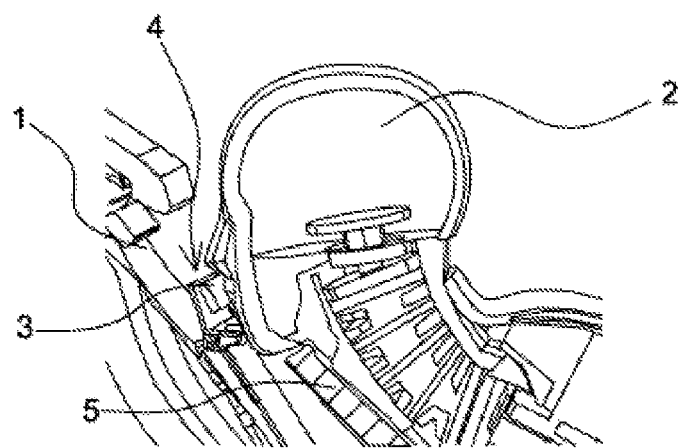
Figure 1C:
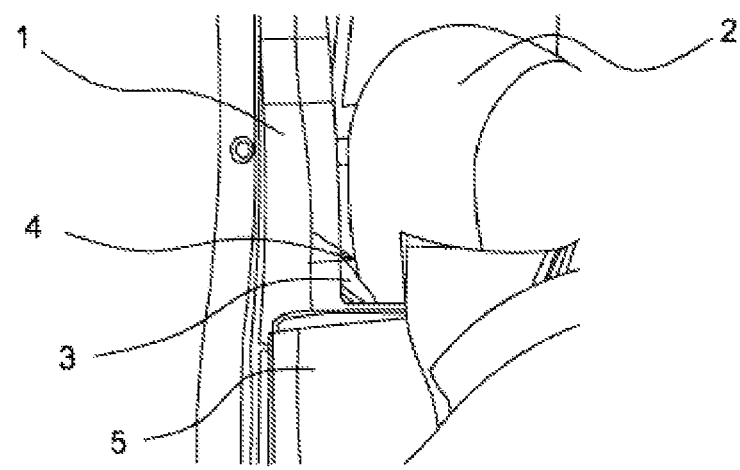
Figure 1D:
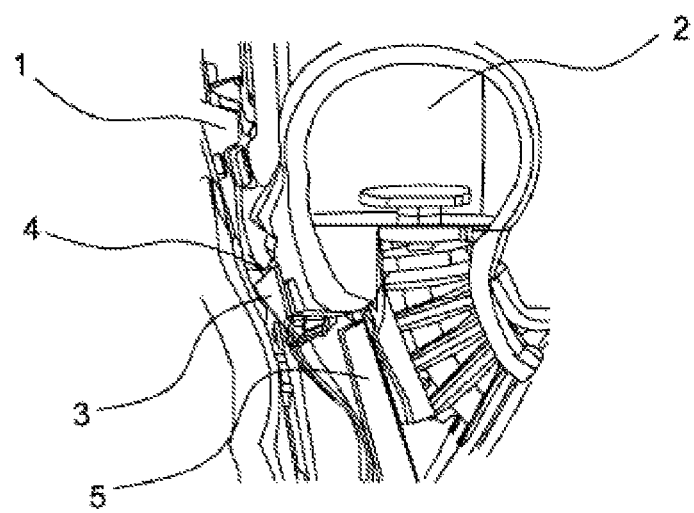
Figure 2:
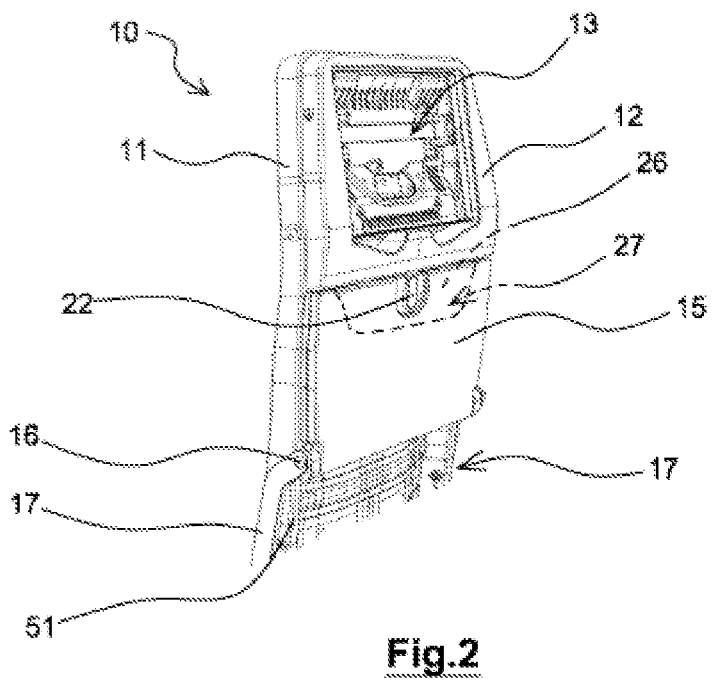
FIG. 2 is a perspective view of a backrest equipped with a tray table provided with a locking system according to this invention.

FIG. 2 shows an aircraft seat 10 comprising a backrest 11 having on its rear face a shroud 12 located in the upper portion. This shroud 12 comprises a housing 13 for receiving a multimedia screen (not shown).

In addition, a tray table 15 can be moved between a deployed position wherein the tray table 15 is spaced from the backrest 11 so as to extend in a substantially horizontal plane and a stowed position wherein the tray table 15 is folded against the rear face of the backrest 11, as shown in FIG. 2.

Figure 3:
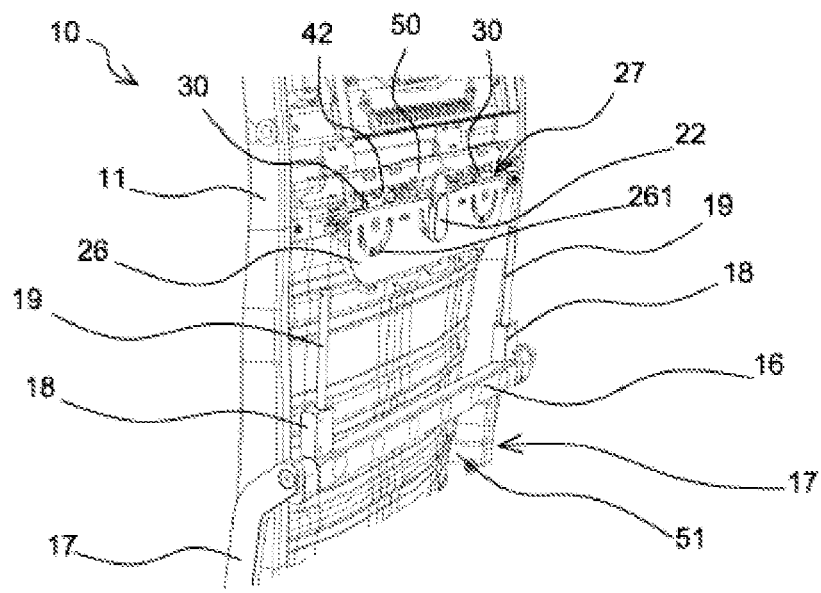
FIG. 3 is a perspective view of the seat in FIG. 2 without the tray table to highlight the cassette integrating the locking system according to the invention.

For this purpose, as can be seen in FIG. 3, the tray table 15 is rotatably mounted around a pivot axis 16 relative to the upper ends of two arms 17 located on either side of the backrest 11. In the deployed position, the tray table 15 may also be translationally movable by a guide bar formed for example by two sliders 18 integral with the tray table 15 being slidable along two rods 19 integral with the pivot axis 16.

A latch 22 holds the tray table 15 in the stowed position. The latch 22 can be moved between a substantially horizontal unlocked position wherein the latch 22 is disengaged from a corresponding housing 23 provided in the shroud 12 (see FIG. 7) and a substantially vertical locked position wherein the latch 22 is engaged in the housing 23 to hold the tray table 15 in the stowed position. Alternatively, the latch 22 is mounted so as to be translationally moveable between the unlocked position and the locked position. The translational movement of the latch 22 may be lateral or vertical.

Figure 4:
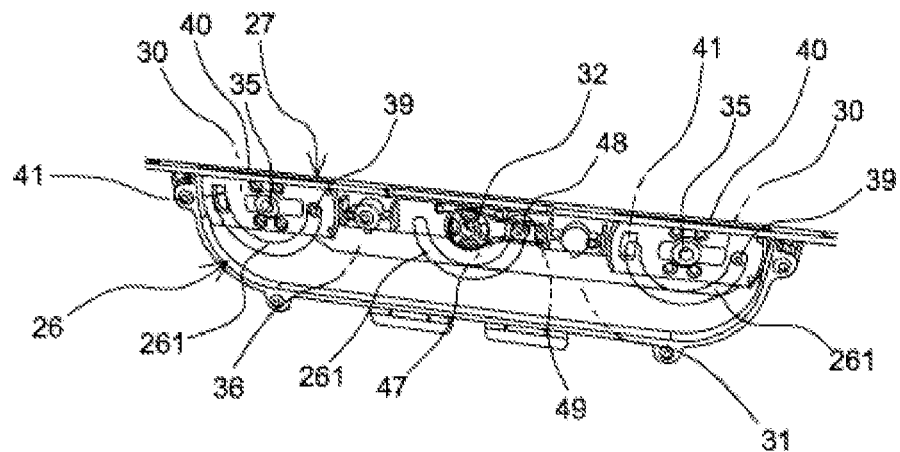
FIG. 4 is a perspective view of the cassette integrating the locking system according to this invention.

Furthermore, as can be seen in FIGS. 3 and 4, a cassette 26 integrates a locking system 27 enabling the tray table 15 to be held in the stowed position following the deformation of the seat 10 during an impact. The cassette 26 is integrated into the tray table 15 by being housed in the thickness of the tray table 15.

Figure 5:
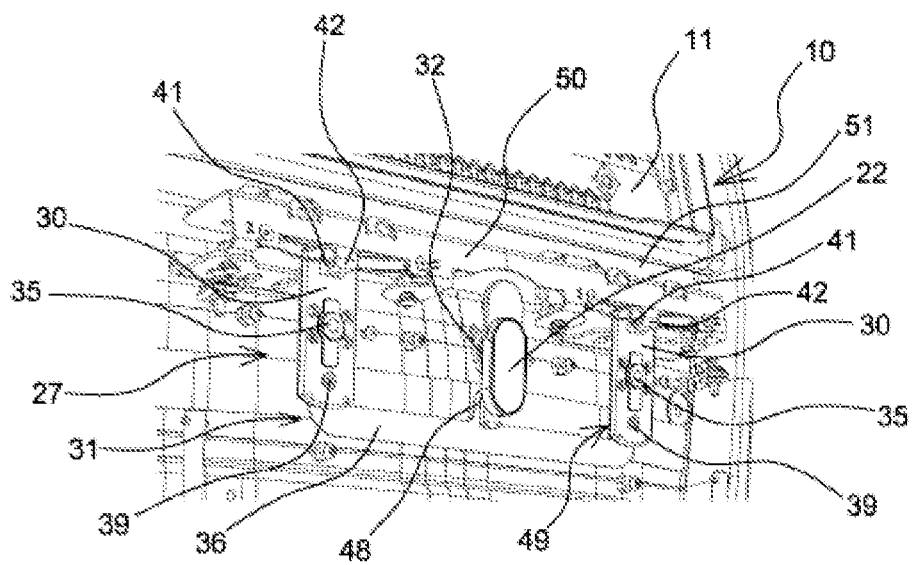
FIGS. 5 and 6 are detailed perspective views of the locking system according to this invention.
Figure 6:
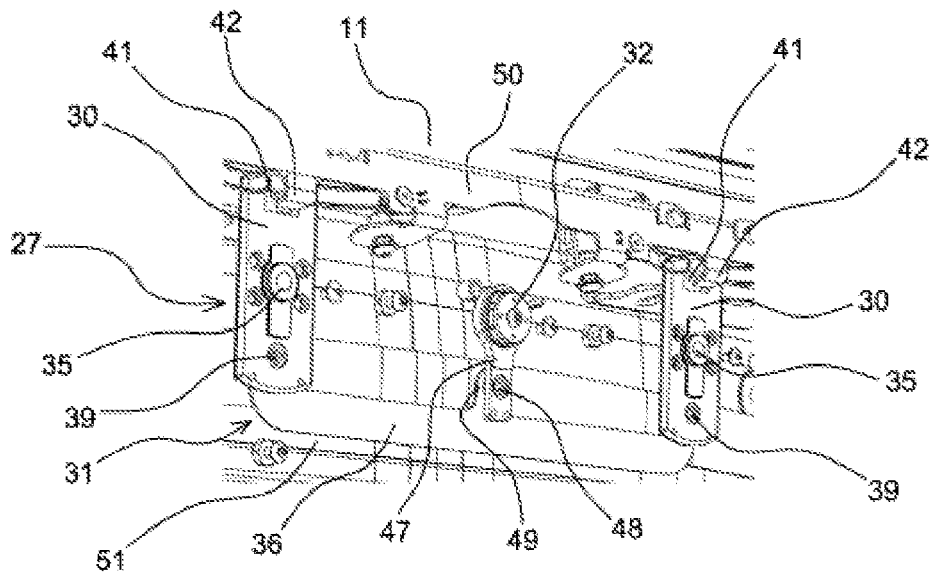
Figure 8:
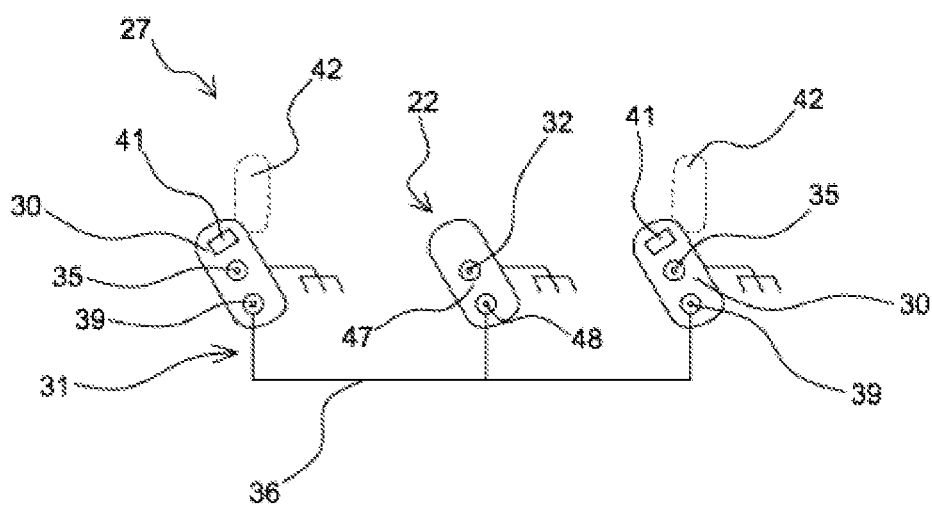
FIG. 8 is a kinematic diagram of the locking system according to this invention.

More precisely, as can be seen in FIGS. 5, 6 and 8, the locking system 27 comprises two lateral locking elements 30 situated on either side of the locking latch 22 as well as a motion transmission device 31 between an axis 32 of the latch 22 and the lateral locking elements 30. The locking elements 30 are generally in the shape of a rectangular plate and are rotatably mounted relative to the cassette 26 attached to the tray table 15. For this purpose, each locking element 30 comprises a central pivot linkage 35.

Figure 7:
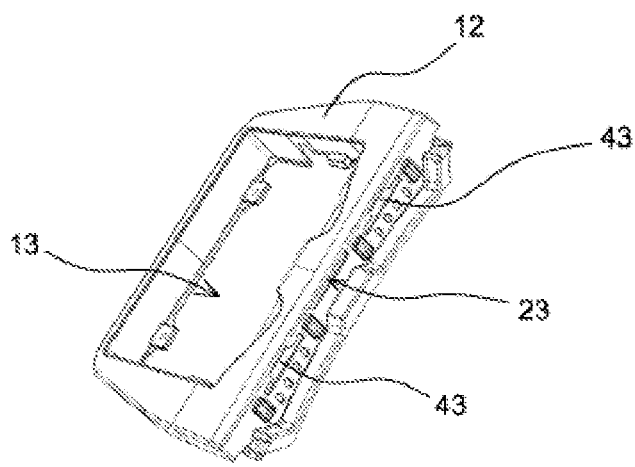
FIG. 7 is a perspective view of the seat shroud according to this invention.

In addition, one end of each locking element 30 is articulated relative to a rocker 36 in the device 31 by a pivot linkage 39. The other end of each locking element 30 is provided with an opening 41 intended to be located opposite a corresponding hook 42 when the latch 22 is in the locked position. As can be seen in FIG. 4, openings 40 provided in the upper face of the cassette 26 allow the locking elements 30 to move from one position to another. The shroud 12 is also provided with two corresponding openings 43, as can be seen in FIG. 7. These two openings 43 have a central clearance to allow the locking elements 30 to move during the deformation of the seat 10.

Moreover, the rocker 36 is connected to the latch 22 by an arm 47. As can be seen in FIG. 6, the arm 47 has an end rotationally integral with the axis 32 of the latch 22 and an end rotatably mounted relative to the rocker 36 by a pivot linkage 48.

In the example shown, the rocker 36 has an elongated shape in a transverse direction from the seat 10 and protruding portions 49 extending perpendicular to the elongated portion and directed upwards. The various pivot linkages 39, 48 are located on the free ends of the protruding portions 49 of the rocker 36. As can be seen in FIGS. 3 and 4, it will be possible to provide in the cassette 26 semicircular shaped guiding grooves 261 to guide the linkages 39 and 48 when the rocker 36 moves from one position to another.

Moreover, the hooks 42 are provided in a transverse support 50. This transverse support 50 is integral with the structure 51 of the seat 10 carrying the backrest 11. In the example shown, the hooks 42 have an L shape. The hooks 42 are located at a distance from the rear face of the backrest 11 and comprise a portion directed downwards extending substantially parallel to the rear face of the backrest 11 and a folded end portion directed towards the rear face of the backrest 11. In the locking position, each opening 41 of a locking element 30 is located between the rear face of the backrest 11 and the end of the corresponding hook 42.

The operation of the locking system 27 in this invention is described below.

When the tray table 15 is in the deployed position, the locking elements 30 are retracted inside the cassette 26, as shown in FIG. 4.

In order to put the tray table 15 into the stowed position, the tray table 15 is rotated around the axis 16, such that the tray table 15 is flush with the rear face of the backrest 11. The opening 41 of the locking elements 30 is offset circumferentially relative to the corresponding hooks 42. The latch 22 is then rotated 90 degrees to move into the locked position in order to hold the tray table 15 in position. The rotation of the latch 22 causes, via the arm 47, movement of the rocker 36, which moves the locking elements 30 into a vertical position, as illustrated in FIGS. 5 and 6.

Thus, when the latch 22 is in the locked position, the openings in the locking elements 30 are located opposite a fixed hook 42 while also being at a distance from this hook 42. In the event of deformation of the seat 10, at least one hook 42 penetrates into the opening 41 of a locking element 30 to hold the tray table 15 in the stowed position. Indeed, following the deformation of the seat structure 51 occurring, for example, in a phase of floor deformation called "pitch and roll", during which a stress is imparted onto one of the rails of the seat 10 such that it moves down and a stress is imparted onto the other rail such as to rotate it, there is a relative movement between a locking element 30 and a corresponding opposite hook 42, such that at least one of the hooks 42 penetrates into the corresponding opening 41. The tray table 15 integral with the locking element 30 engaged with the hook 42 is then held in the stowed position.

If the seat 10 has not been deformed, a rotation of the latch 22 in an opposite direction to the unlocked position causes the rocker 36 to move. The rocker 36 moves the locking elements 30 into the horizontal position wherein the locking elements 30 are retracted into the tray table 15, such that the openings 41 of the elements 30 are offset circumferentially relative to the hooks 42, i.e., the openings 41 are no longer opposite the hooks 42. The tray table 15 can then again be rotated down around the axis 16 to return to the deployed position.

It is thus noted that when the seat 10 is not deformed, the locking elements 30 do not interfere with the operation of the tray table 15, which behaves as if it were provided only with a locking latch 22. It is only when the seat 10 is deformed that the locking elements 30 act to prevent unintentional opening of the tray table 15 and therefore the risk of entrapping the chin of passengers.

Alternatively, it will be possible to provide more than two locking elements 30 or a single locking element 30 mechanically connected to the axis of the latch 22 via the rocker 36.

The invention can also be implemented with seats installed in other means of transport, such as, for example, seats for motor vehicles, trains, or boats.

The invention is of course not limited to the embodiments described above, which are provided solely by way of example. It encompasses various modifications, alternative forms and other embodiments that may be considered by those skilled in the art within the scope of this invention, and in particular any combination of the different modes of operation described above, which can be taken separately or in combination.

The invention claimed is:

1. A seat comprising a backrest carrying on a rear face side a tray table that can be moved between a deployed position and a stowed position,
   said tray table comprising a latch that can be moved between an unlocked position and a locked position,
   characterized in that said tray table further comprises a locking system configured to hold the tray table in a stowed position following deformation of said seat during an impact,
   characterized in that the locking system comprises at least one locking element connected to the latch via a motion transmission device,
   characterized in that when the latch is in the locked position, an opening in the locking element is located opposite a fixed hook integral with a seat structure while also being at a distance from this hook, such that in the event of the deformation of the seat, said hook penetrates into the opening of the locking element to hold the tray table in a stowed position.

2. The seat according to claim 1, characterized in that the motion transmission device comprises a rocker connected both to the latch and to the locking element by a pivot linkage.

3. The seat according to claim 2, characterized in that the rocker is connected to the latch by an arm.

4. The seat according to claim 3, characterized in that the arm has an end rotationally integral with an axis of the latch and an end rotatably mounted relative to the rocker.

5. The seat according to claim 1, characterized in that the seat further comprises two lateral locking elements located on either side of the latch.

6. The seat according to claim 1, characterized in that the locking system is integrated into a cassette.

7. The seat according to claim 6, characterized in that the cassette is located in the tray table by being housed in the thickness of the tray table.

8. The seat according to claim 6, characterized in that the locking element is rotatably mounted relative to the cassette by a pivot linkage.

\* \* \* \* \*